Aug. 21, 1956  J. BOLSEY  2,759,561
POWER ARRANGEMENTS FOR CINEMATOGRAPHIC CAMERAS
Filed June 26, 1952  4 Sheets-Sheet 1
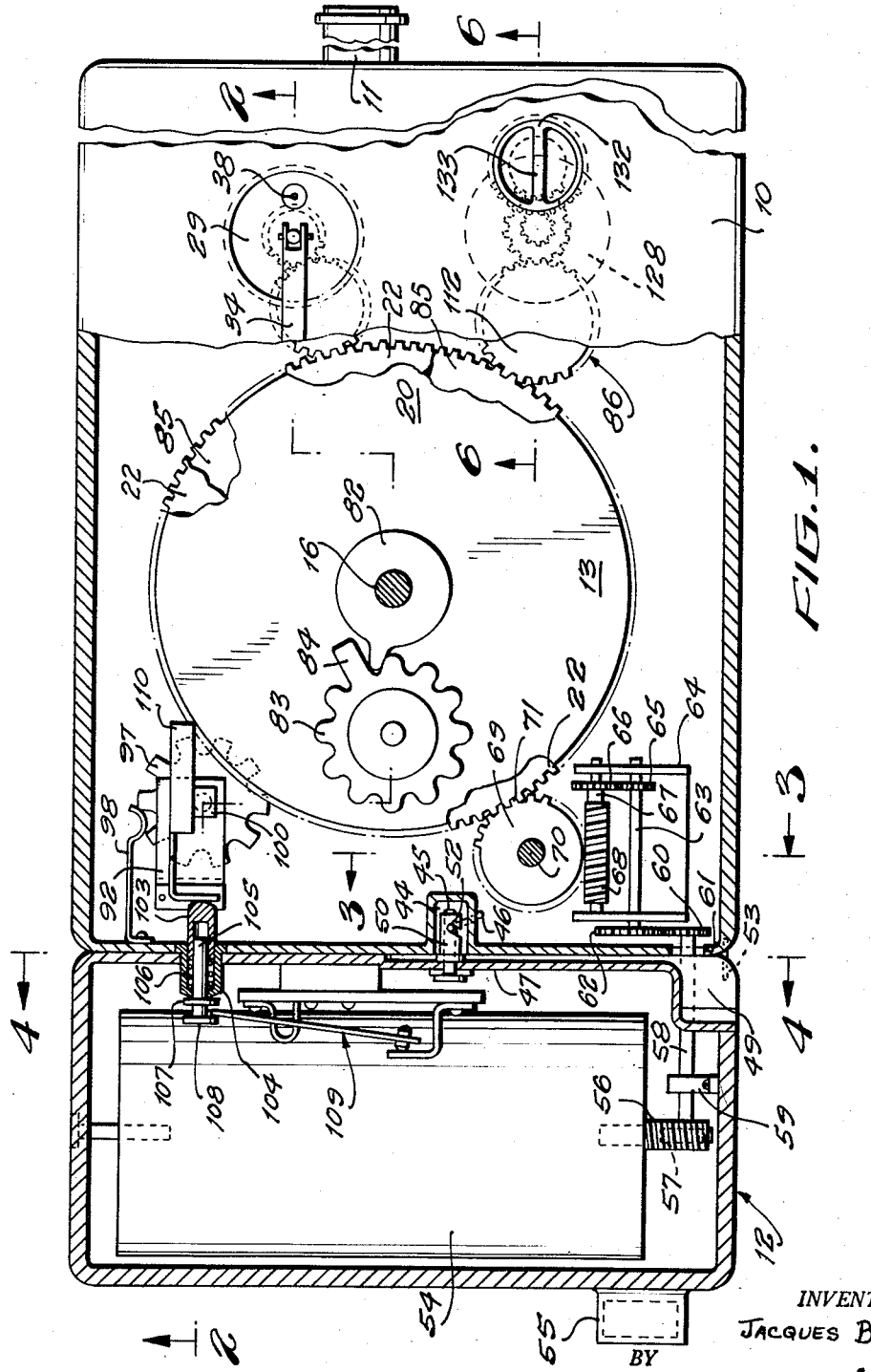
INVENTOR.
JACQUES BOLSEY
BY Aug. 21, 1956  J. BOLSEY  2,759,561
POWER ARRANGEMENTS FOR CINEMATOGRAPHIC CAMERAS
Filed June 26, 1952  4 Sheets-Sheet 2
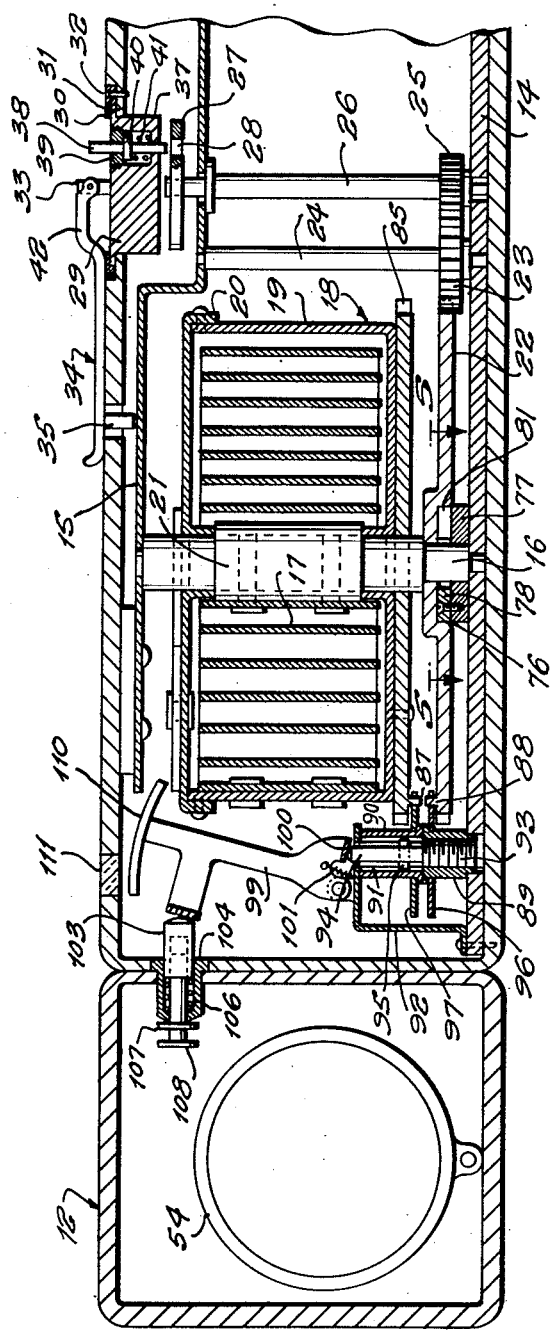
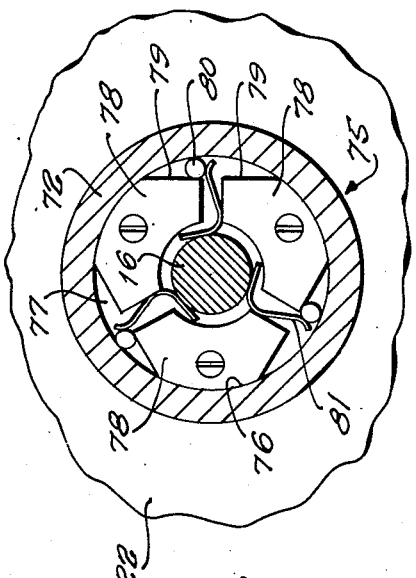
INVENTOR.
JACQUES BOLSEY
BY

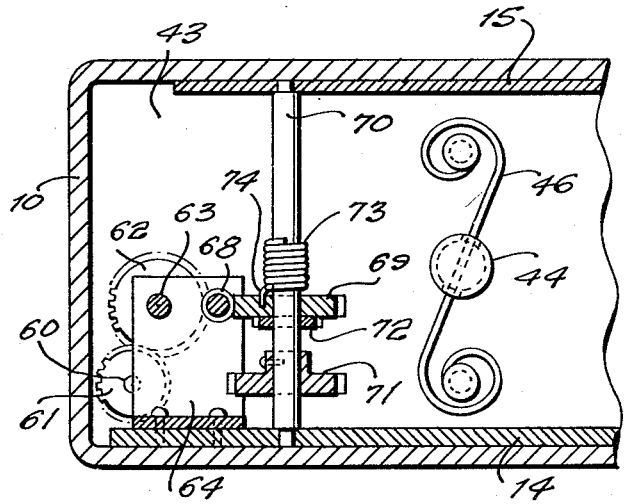
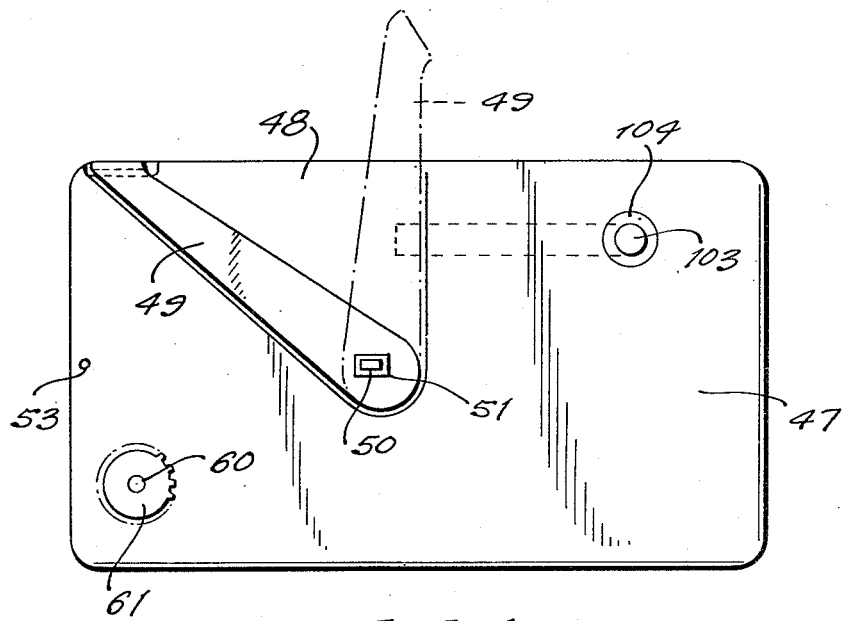

Aug. 21, 1956  J. BOLSEY  2,759,561
POWER ARRANGEMENTS FOR CINEMATOGRAPHIC CAMERAS
Filed June 26, 1952  4 Sheets-Sheet 4

INVENTOR.
JACQUES BOLSEY
BY

United States Patent Office 2,759,561
Patented Aug. 21, 1956

2,759,561

POWER ARRANGEMENTS FOR CINEMATO-
GRAPHIC CAMERAS

Jacques Bolsey, New York, N. Y.

Application June 26, 1952, Serial No. 295,787

12 Claims. (Cl. 185—40)

The present invention relates to cinematographic cameras.

More particularly the present invention relates to an apparatus for supplying power to a cinematographic camera for driving the parts thereof.

One of the objects of the present invention is to provide a cinematographic camera with an electric motor capable of automatically tensioning a spring motor mounted on the cinematographic apparatus.

A further object of the present invention is to provide a means for removably mounting an electric motor on a cinematographic camera having a spring motor so that the latter may be automatically tensioned by the electric motor.

Another object of the present invention is to provide a means for manually tensioning a spring motor in an apparatus of the above type with the electric motor mounted on or removed from the camera.

An additional object of the present invention is to provide an adjustable governor means for regulating the speed with which the camera is operated.

Yet another object of the present invention is to provide a means for indicating to the operator the degree to which the spring motor is tensioned.

With the above objects in view the present invention mainly consists of a cinematographic apparatus having a casing in which a spring motor is located for driving parts of the apparatus. A tensioning means is adapted to be removably mounted on the casing to tension the spring motor, and the latter is manually tensionable whether or not the tensioning means is mounted on the apparatus. A control means is provided between the tensioning means and spring motor to automatically stop and start the tensioning means to maintain the tension of the spring motor between predetermined limits, and at least a part of this control means is connected to the tensioning means so as to be removable therewith from the apparatus. An adjustable governor means is provided to adjust the speed at which the cinematographic apparatus is operated, and this governor means includes a very simple structure for increasing the centrifugal force required to move the governor masses as the latter move outwardly during operation of the camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side, partly sectional view of a cinematographic apparatus in accordance with the present invention;

Fig. 2 is a sectional view taken along line 2—2 of Fig. 1 in the direction of the arrows;

Fig. 3 is a sectional view taken along line 3—3 of Fig. 1 in the direction of the arows;

Fig. 4 is a side view of the electric motor unit taken along line 4—4 of Fig. 1 in the direction of the arrows and showing parts extending from the electric motor unit in full lines;

Fig. 5 is a fragmentary, partly sectional view taken along line 5—5 of Fig. 2 in the direction of the arrows;

Figure 6:
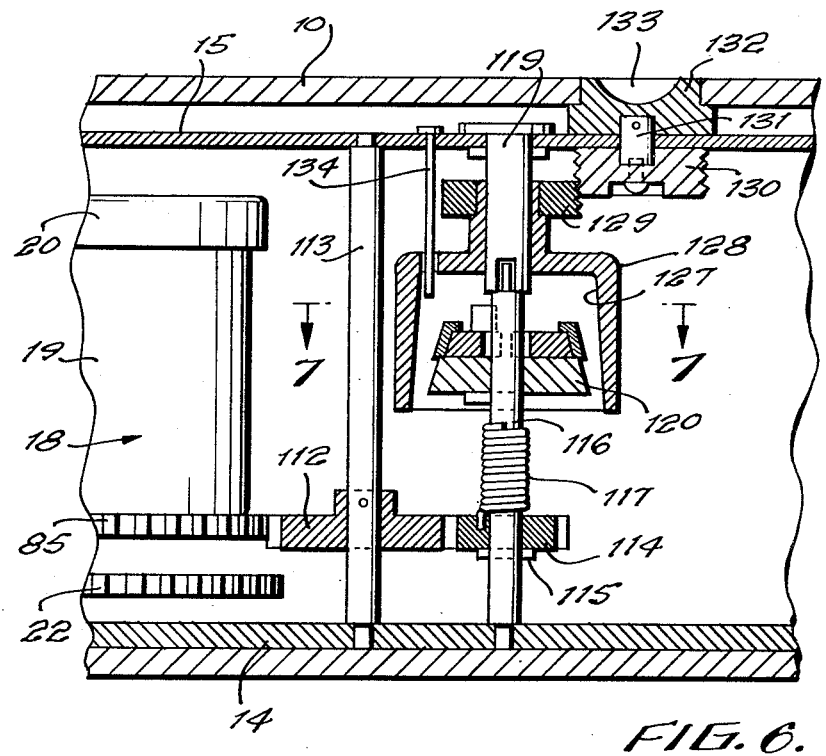
Fig. 6 is a sectional, fragmentary view taken along line 6—6 of Fig. 1 in the direction of the arrows.

Referring now to the drawings, there is shown in Fig. 1 a picture taking unit 10 having the objective 11, diagrammatically illustrated in Fig. 1, located at the front end thereof. An electric motor unit 12 is connected to the rear end of the picture taking unit 10, and a spring motor 13 is located within this picture taking unit.

As is apparent from Fig. 2, the picture taking unit 10 is provided with opposite plates 14 and 15 to support the various parts of the apparatus. The barrel shaft 16 of the spring motor 13 is supported by the plates 14 and 15 for free rotation and has the inner end of a spiral spring 17 fixedly connected thereto. A barrel 18 is located about a shaft 16 for free rotation with respect thereto and includes the container portion 19 with the cover 20 connected thereto, these parts 19 and 20 having inwardly extending tubular portions located about the shaft 16 and bearing against the sleeve 21 fixedly connected to the shaft 16 by the pins which fix the spring 17 to shaft 16 so that the barrel 18 is in this way mounted for free rotation about the shaft 16. The spring 17 is fixed at its outer end to the barrel 18.

The spiral spring 17, in the particular example illustrated, is tensioned by rotation of the barrel shaft 16, and for this purpose a gear 22 is fixed to the shaft 16 in order to turn the same. As is shown in Fig. 2, the gear 22 meshes with a gear 23 fixed to a shaft 24 which is supported for free rotation by the plates 14 and 15, and the gear 23 meshes with a gear 25 fixed on a shaft 26 also supported for free rotation by the plates 14 and 15. The shaft 26 extends through an opening of the plate 15 and has fixedly mounted thereon a plate 27 formed with circularly arranged perforations 28.

Mounted on the side wall of housing 10 over the plate 27 is a member 29 which is mounted for rotation on the housing 10 by means of an annular flange 30 of member 29 which engages a countersunk portion 31 of the housing 10. A ring 32 having an anular flange portion overlapping the member 29 is fixed in the countersunk portion 31 to maintain the member 29 on the housing 10.

A pin 33 extends upwardly from the member 29 and carries a pivot pin which pivotally supports a crank 34 for turning movement through 180° between operative and inoperative positions. The crank 34 is illustrated in Fig. 2 in its inoperative position where the handle 35 of crank 34 extends through an opening in the housing 10. As is shown in Fig 2, the outer end of crank 34 is curved to enable the same to be easily turned away from the side of housing 10.

The member 29 is provided with a recess 36 having an apertured floor portion 37, and a pin 38 extends through the recess 36 and the aperture of floor portion 37, this pin being located directly over the circle of perforations 28. The recess 36 is threaded adjacent the top thereof, and a threaded cover plate 39 covers the recess 36 and is formed with an aperture through which the pin 38 extends. This pin carries a collar 40 and a coil spring 41 is located about the pin 38 and engages the collar 40 thereof to urge the pin 38 away from the plate 27. As is shown in Fig. 2, the crank 34 is provided with a bent portion 42 adjacent the pin 33 and adapted to be located against the pin 38 when the crank 34 is moved through 180° from its inoperative position illustrated in Fig. 2 to an operative position. When the crank is in its operative position, the bent portion 42 does not contact the ring 32 so that the member 29 may be turned by turning of the crank 34. The movement of portion 42 of crank 34 against the member 29 moves the pin 38 against the action of spring 41 toward the plate 27 so that the pin 38 enters one of the apertures 28 and thereby constrains the shaft 26 to turn when the crank is turned. In this way, the spring motor 13 may be manually tensioned by the crank 34 while being completely disconnected from the latter when the crank is in an inoperative position.

As is shown in Fig. 1, the electric motor unit 12 is adapted to be removably mounted on the picture taking unit 10. The rear wall 43 of the picture taking unit 10 is formed with a recess 44 having opposite slots 45 extending through the wall thereof. A spring 46 (Fig. 3) is fixed at its opposite ends to the wall 43 and has a central portion extending through the slots 45 and across the recess 44.

The substantially flat side wall 47 of motor unit 12 is formed with a recess 48 (Fig. 4) in which a handle 49 is located, this handle having a non-circular aperture formed therein. A lock member 50 is pivotally mounted on the wall 47 of motor unit 12 and has a non-circular portion 51 engaged by the handle 49, this lock member being formed with a cut out 52 adapted to engage the portion of spring 46 extending across the aperture 44.

When the motor unit 12 is disconnected from the picture taking unit 10, a cover plate is screwed onto the rear wall 43 of the latter to cover the openings therein. When it is desired to mount the motor unit 12 on the picture taking unit 10, this cover plate is removed, and the handle 49 is moved to the dotted line position shown in Fig. 4 so that the lock member 50 is located at 90° from the position shown in Fig. 1 and may move into the recess 44 to a position beside the central portion of spring 46. Then the handle 49 is turned to the solid line position shown in Fig. 4 so that the cut out 52 of lock member 50 moves over the central portion of spring 46 to the position illustrated in Fig. 1. The electric motor is in this way connected to the picture taking unit 10, the spring 46 resiliently urging the motor unit 12 against the wall 43 of the picture taking unit 10. The motor unit 12 is provided with a pin 53 which enters a recess in the rear wall 43 of the camera 10 so as to properly locate the motor unit 12 on the picture taking unit 10.

The motor unit 12 has mounted therein the electric motor 54 which is supplied with electricity by any suitable leads (not shown) from the plug 55. The shaft of motor 54 has a worm 56 fixed thereto and meshing with a worm wheel 57 located in the motor unit 12 and fixed to a shaft 58 which is rotatably mounted on the bracket 59 fixedly supported in the motor unit 12. The shaft 58 extends through a bearing mounted in the side wall 47 and extends beyond the motor unit 12 where it has fixedly connected thereto a gear 60.

The rear wall 43 of the picture taking unit 10 is formed with an opening 61 of a larger size than gear 60 so that the latter may pass through the opening 61 and mesh with a gear 62 located in the picture taking unit 10, this gear 62 being fixed on a shaft 63 which is rotatably supported on a substantially U-shaped cradle member 64 fixed to the plate 14 of the picture taking unit 10 (Fig. 3). The shaft 63 has fixedly mounted thereon a gear 65 which meshes with a gear 66 mounted on shaft 67 which is parallel to shaft 63 and also rotatably supported by member 64. Shaft 67 has fixedly mounted thereon a worm 68 which meshes with a worm wheel 69 supported for free rotation on the shaft 70 which is rotatably supported by the opposite plates 14 and 15. The shaft 70 has fixedly mounted thereon a gear 71 which meshes with the gear 22 fixed to the barrel shaft 16.

A collar 72 is fixed to shaft 70 to support the worm wheel 69 for free rotation thereon. A coil spring 73 is located about the shaft 70 in engagement with the latter and has a lower bent end 74 extending into an opening in the worm wheel 69, as shown in Fig. 3. Thus, when the motor 54 is operated it turns the worm wheel 69 through the transmission 56, 57, 59, 60, 62, 65, 66 and 68. The worm wheel 69 is turned by the motor 54 in a clockwise direction, as viewed in Fig. 1, so that it pulls on end 74 of spring 73 and tends to decrease the diameter of the latter so that spring 73 tightly grips the shaft 70 which is thereby rotated with the worm wheel 69. Thus, the rotation of the motor is transmitted to the gear 71 and from the same to the gear 22 to turn the barrel shaft 16 and in this way tension the spring motor 13.

When the crank 34 is in an inoperative position, the plate 27 rotates when the spring motor 13 is being tensioned by the electric motor unit 12. However, when the latter is not operating, the crank 34 may be used to manually tension the spring motor in the manner described above. During this manual tensioning of the spring motor, the shaft 70 is free to turn in the spring 73 so that the worm and worm wheels in the transmission from the motor 54 do not prevent manual tensioning of the spring motor, the spring 73 forming a friction clutch which permits the manual tensioning to take place.

In order to prevent the energy stored in the spring motor 13 through the barrel shaft 16 from being dissipated through the barrel shaft, a one way rotation device 75 (Fig. 5) is provided. As is apparent from Fig. 2, the central portion of gear 22 is dished so as to provide an inner cylindrical wall surface 76. Fixed to the plate 14 is a circular plate 77 which has three members 78 fixedly mounted thereon, as shown in Fig. 5. The members 78 have inner arcuate portions located adjacent to the shaft 16 and outer arcuate portions located along the inner cylindrical surface 76 of the dished portion of gear 22. Also, these members 78 have outer flat side faces 79 which face the cylindrical wall portion 76, each member 78 having two side faces 79 which form a continuation of side faces of the other members 78, as shown in Fig. 5. Three cylindrical friction members 80 are located between side faces 79 and the cylindrical wall 76, and three substantially L-shaped leaf springs 81 are mounted in the spaces between the members 78 and engage the latter, the shaft 16 and the friction members 80 to urge the latter in a counterclockwise direction, as viewed in Fig. 5. Thus, when the gear 22 tends to rotate in a counterclockwise direction, the friction members 80 bear against the cylindrical surface 76 to prevent rotation of the member 22. When the latter rotates in a clockwise direction, as viewed in Fig. 5, the cylindrical surface 76 moves the friction members 80 against the action of the L-shaped leaf springs 81 so that the spring motor 13 may be tensioned when the gear 22 turns in a clockwise direction, as viewed in Figs. 1 and 5. When the spring motor is not being tensioned, the one way rotation device 75 prevents the power stored in the spring motor through the barrel shaft 16 from being dissipated through the latter.

The apparatus of the invention includes a device for limiting the extent to which the spring motor may be tensioned and untensioned. As is shown in Fig. 1, a one-toothed gear 82 is fixed to the barrel shaft 16 and located over cover 20 of the barrel 18. A toothed wheel 83 is mounted for free turning movement on the barrel cover 20 and includes one tooth 84 which is larger than its other teeth, as is clearly shown in Fig. 1. The parts 82 and 83 are shown in Fig. 1 in the position which limits the untensioning of the spring motor 13, the latter being pretensioned to a predetermined degree when members 82 and 83 are joined in the position illustrated in Fig. 1.

When the spring motor is tensioned, the barrel shaft 16 and one-toothed gear 82 therewith turn in a clockwise direction, as viewed in Fig. 1, and turn the member 83 in a counterclockwise direction, as viewed in Fig. 1, through a fraction of a revolution during each rotation of barrel shaft 16. In the particular example illustrated, the barrel shaft 16 and the one-toothed gear 82 therewith may turn through 15 revolutions before the tooth 84 engages the gear 82 on the opposite side of its tooth from that illustrated in Fig. 1 to prevent further tensioning of the spring motor 13. The latter may then be untensioned, and during this untensioning of the spring motor the tooth 84 moves back toward the position shown in Fig. 1. The members 83 and 84 provide limits on the manual tensioning of the spring motor. The tensioning of the spring motor by the electric motor is maintained within the limits set by members 82 and 83 by an automatic control means now to be described.

The power stored in the spring motor 13 is taken from the barrel thereof through the medium of the gear 85 fixed to the underside of barrel portion 19 for rotation therewith and located over the gear 22, the gear 85 being of the same diameter as gear 22. The gear 85 meshes with a gear train 86, partially illustrated in Fig. 1, to transmit power to the various parts of the camera. The gear 85 is provided on its underside with a projection 87, and the gear 22 is provided on its top side with a projection 88, as shown in Fig. 2.

Located adjacent to the gear 22 is a nut member 89 mounted for free rotation on the plate 14, and located coaxially over and on the nut 89 is a tubular member 90 having a pair of inner opposite grooves 91. A bracket 92 is fixed to the plate 14 and is located over the tube 90 to maintain the same in contact with the nut 89. A screw member 93 is in threaded engagement with the nut 89 and has a shank portion 94 carrying a pair of opposite projections 95, formed by a pin extending transversely through the shank portion 94, these projections 95 being located in the grooves 91.

A star wheel 96 is fixedly connected to the nut 89 and overlaps the gear 22 to be periodically engaged by the projection 88 thereof so that the star wheel 96 and the nut member 89 therewith are periodically turned through a fraction of a revolution during each revolution of gear 22. In the particular example illustrated, the star wheel 96 has ten teeth and is moved through one tenth of a revolution during each revolution of the gear 22. A second star wheel 95 is fixed to the tube 90 and overlaps the peripheral portion of gear 85 to be periodically turned by projection 87 thereof, the star wheel 97 being identical with star wheel 96 so that it also is turned through one tenth of a revolution during each revolution of the gear 85. As is shown in Fig. 1, a leaf spring member 98 having a free, curved end in engagement with the teeth of star wheels 96 and 97 prevents the latter from turning through more than one tenth of a revolution each time they are actuated by the projections 87 and 88. The bracket 92 maintains the tube 90 with a relatively light force against the nut 89 so that the tube 90 is easily turned.

Pivotally mounted on the bracket 92 is a switch operating member 99 which has a portion 100 engaging the free end of shank portion 94 so that, as the screw member 93 moves in and out of the nut 89, the member 98 will turn on the bracket 92. A spring 101 urges the portion 100 of member 99 against the shank portion 94 of screw member 93. The member 99 has an extension 102 thereof laterally bent and located against an internally threaded member 103 which is slidably mounted in a hollow guide 104 fixedly mounted on the wall 47 of the motor unit 12, and extending through this wall. It will be noted that the guide 104 has a peripheral portion located in an opening in wall 43 so as to serve as a locating member for a motor unit 12.

The left wall of the guide 104, as viewed in Figs. 1 and 2, is apertured, and a pin 105 extends therethrough and is in threaded engagement with the member 103, a spring 106 being located within guide 104 about pin 105 and bearing against member 103 to urge the latter to the right, as viewed in Figs. 1 and 2. The member 105 carries a collar 107 to limit its movement to the right under the influence of spring 106, and this member 105 carries a second collar 108 spaced from the collar 107. In the space between the collars 107 and 108 there is located an end of an actuating member of a microswitch 109 located in the motor unit 12 and connected by the electrical leads (not shown) into the circuit of the motor 54 to operate the same when the microswitch 109 is closed. This microswitch is illustrated in its closed position in Fig. 1.

The above described control apparatus for automatically stopping and starting the motor 54 operates as follows:

Assuming that the camera is operating and power is being taken from the spring motor 13, the gear 85 will rotate in a clockwise direction, as viewed in Fig. 1, and the projection 87 thereof will periodically turn the star wheel 97 in a counterclockwise direction. This turning of star wheel 97 causes the tube 90 to turn also in a counterclockwise direction, and the latter turns the screw 93 into the nut 89, the latter members being provided with left hand threads. When the screw member 93 has moved into the nut 89 sufficiently to permit the member 105 to move to the right, as viewed in Fig. 1, to the position illustrated in Fig. 1, the microswitch 109 is closed and the motor 54 starts to operate. This produces a clockwise turning of gear 22, as viewed in Fig. 1 and as described above, and this clockwise turning of gear 22 produces a counterclockwise turning of star wheel 96 through the medium of projection 88. This turning of star wheel 96 causes the nut 89 to also turn in a counterclockwise direction, as viewed from above in Fig. 2, and this causes the screw 93 to move out of the nut 89 and produce a counterclockwise turning member 99, as viewed produce a counterclockwise turning of member 99, as viewed in Fig. 2. If the tube 90 should happen to be stationary at this time, the screw 93 will not rotate about its axis because of the cooperation of projections 95 and grooves 91. The upward movement of screw member 93 continues until collar 107 opens switch 109 and the motor 54 stops operating. The member 103 may be turned on the pin 105 to vary the combined length of these members 103 and 105 and thereby adjust the parts to properly operate the microswitch 109.

As is shown in Figs. 1 and 2, the switch operating member 99 is provided with a curved portion 110 located beneath a transparent window 111 in the wall of housing 10. This portion 110 of member 99 may have placed thereon any suitable calibrations, such as an indication of the number of feet of film which the spring motor can still drive through the camera, these calibrations being visible through the window 111 so that the operator will know the extent to which the spring motor is tensioned.

Connected to the gear train 86 is a governor mechanism for regulating the speed at which the camera is operated by the spring motor 13. As is apparent from Fig. 6, the gear 112 of the gear train 86 meshes with the gear 85 fixed to the barrel 18 of the spring motor and is fixed to the shaft 113 which is rotatably supported by the opposite plates 14 and 15. Gear 112 also meshes with gear 114 which is connected to further gears (not shown) of gear train 86 for transmitting the drive from the spring motor to the various parts of the picture taking unit. Gear 114 is supported by the collar 115 for free rotation on the shaft 116 which is rotatably supported on the plate 15. A spring 117 is provided with a bent end 118 located in an opening of gear 114 and frictionally engages the shaft 116. Fixed to the plate 15 over the shaft 116 is a shaft 119 formed with an axial bore at its lower end, as viewed in Fig. 6, and the shaft 116 has an upper end, as viewed in Fig. 6, which is rotatably supported in the axial bore of shaft 119 so that the shaft 116 is in this way mounted for free rotation.

Figure 7:
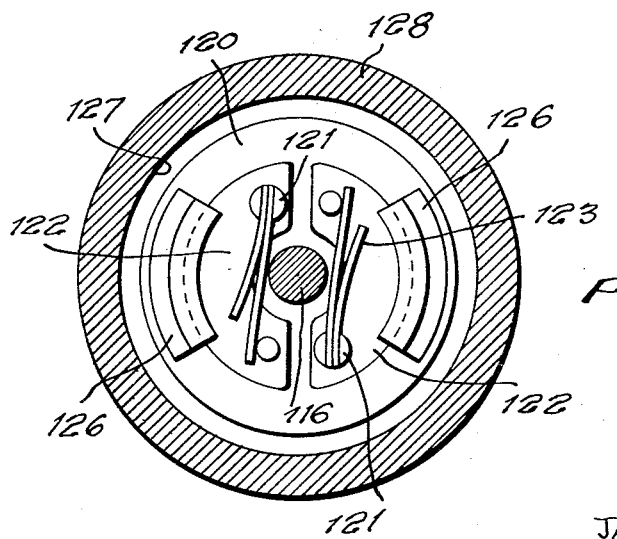
Fig. 7 is a sectional view taken along line 7—7 of Fig. 6 in the direction of the arrows.

A support plate 120 is fixedly mounted on shaft 116 for rotation therewith by any suitable means, as for example by being keyed thereto, this support 120 having an outer peripheral conical side surface. As is shown most clearly in Fig. 7, a pair of pivot pins 121 are fixed to the support 120 and respectively pass through apertures of a pair of masses 122 so as to pivotally support these masses on the plate 120 for free pivotal movement toward and away from the shaft 116. Each of the pivot pins 121 is provided with a headed end located over the masses 122, and fixed to the headed end of each pin 121 is a rigid curved bar 123 and a leaf spring 124. Each mass 122 carries a projection 125 distant from the pivot pin 121 and engaged by the spring 124 to be urged thereby inwardly toward the shaft 116. Thus, during rotation of shaft 116 the centrifugal force imparted to the masses 122 will cause them to turn about the pivot pins 121 away from the shaft 116, and during this turning of the masses the leaf springs 124 will be turned and will contact the curved bars 123 to a gradually increasing extent so that the centrifugal force required to move the masses outwardly away from shaft 116 gradually increases with an increase in the distance of the masses from the shaft 116.

Each of the masses 122 has fixedly mounted thereon a brake shoe 126 which is made of any suitable fibrous material and adapted to frictionally contact the inner conical surface 127 of the cylinder 128 located about the support 120. As shown in Fig. 6, the cylinder 128 has a tubular hub portion mounted for sliding movement along stationary shaft 119 and has fixedly connected to the hub portion, member 129 formed with rack teeth which are engaged by a screw member 130 fixed to the pin 131 which is mounted for rotation in a bore in plate 15, which extends through plate 15, and which, on the other side of plate 15 from screw 130, is fixed to the knob 132 which has a recessed portion provided with a web 133 located substantially at the level of the outer surface of housing 10 so that the knob 132 may easily be turned so as to rotate screw 130 and cause the cylinder 128 to be moved along the shaft 119. A stationary pin 134 is fixed to the plate 15 and extends through an opening in the cylinder 128 to prevent rotation thereof, as is clearly shown in Fig. 6.

Any suitable calibrations may be provided on the housing 10 adjacent to knob 132 to cooperate with an index mark on the latter for indicating to the operator the speed at which the camera is set to operate. It is evident that as the cylinder 128 moves toward the gear 114, the inner conical surface 127 will be progressively located nearer to the masses 122 to gradually decrease the extent to which these masses can swing out, and therefore the speed at which the camera is operated will necessarily be reduced by movement of the cylinder 128 in a downward direction, as viewed in Fig. 6, toward the gear 114.

When the stop and start mechanism (not shown) of the camera is operated to start the operation of the camera, the energy from the spring motor 13 is released and turns the gears 112 and 114. Gear 114 turns in a clockwise direction, as viewed from above in Fig. 6, and this turning of gear 114 causes a pull on the bent end 118 of spring 117 which causes the inner diameter of the coils of the latter to decrease. In this way the spring 117 tightly grips the shaft 116 to cause the latter to be turned by the rotation of gear 114. When the stop and start mechanism of the camera is actuated to stop the operation of the camera, the gears 112 and 114 suddenly stop turning, but the shaft 116 is free to turn in the spring 117 because the inner diameter of the latter tends to increase when gear 114 stops rotating, and in this way the governor is able to come to a gradual stop when the operation of the camera is terminated.

It will be understood that each of the elements described above, or two or more together, may also find a useful application in other types of power arrangements for cinematographic cameras differing from the types decribed above.

While the invention has been illustrated and described as embodied in an apparatus for manually or mechanically tensioning a spring motor of a cinematographic apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to to be comprehended within the meaning and range of equivalence of the following claims.

What is claimed as new and desired to be secured by Letters Patent is:

1. Cinematographic apparatus, comprising, in combination, a casing; a spring motor located in said casing for driving parts of the apparatus; tensioning means removably mounted on said casing for tensioning said spring motor; and control means, at least partially connected to said tensioning means so as to be removable from said casing therewith, for stopping and starting said tensioning means when said spring motor becomes tensioned and untensioned between predetermined limits, said control means comprising a first star wheel operatively connected to said tensioning means to be periodically turned thereby, a second star wheel located adjacent to said first star wheel and being operatively connected to said spring motor be be periodically turned thereby, a nut fixed to one of said star wheels to turn therewith, a screw member engaging said nut and being connected to the other of said star wheels for rotation therewith and movement in translation with respect to the same, and an actuating member for actuating said tensioning means movably mounted on the apparatus adjacent to said screw member and engaging the same to be moved thereby between two positions at which said tensioning means is respectively stopped and started.

2. In a cinematographic apparatus, in combination, a spring motor for driving parts of the apparatus, said spring motor including a shaft rotatably mounted on the apparatus, a barrel located about said shaft for rotation with respect thereto, and a spring connected at one end to said shaft and at an opposite end to said barrel; a first gear connected to said barrel for rotation therewith and having a projection located thereon adjacent the periphery thereof; a second gear located opposite said first gear, being fixedly connected to said shaft, and having a projection thereon located adjacent to the periphery thereof; a nut turnably mounted on the apparatus adjacent to said second gear; a first star wheel fixedly connected to said nut and overlapping the peripheral portion of said second gear to be periodically turned by the projection of the latter; a second star wheel mounted for free rotation coaxially over said first star wheel and overlapping the peripheral portion of said first gear to be turned by the projection of the latter, said second star wheel having a hub formed with an internal groove extending parallel to the axis of rotation of said star wheels; a screw member threadedly engaging said nut and having a projecting portion located in said groove of said hub of said second star wheel; an electric motor operatively connected to said second gear for turning the same to tension said spring; a switch connected to said electric motor for stopping and starting the same; a switch operating member operatively connected to said switch, being pivotally mounted on the apparatus for turning movement between switch opening and switch closing positions and having a portion engaging said screw member so that said switch operating member is turned by movement of said screw member; and resilient means operatively connected to said switch operating member for urging said portion thereof against said screw member.

3. A cinematographic apparatus as defined in claim 2 and wherein said cinematographic apparatus comprises a housing having a transparent wall portion located over said switch operating member and wherein the latter is provided with a calibrated portion located opposite said transparent wall portion of said housing to indicate the degree to which said spring motor is tensioned.

4. In a cinematographic apparatus, in combination, a casing; a spring motor in said casing capable of being manually tensioned; an electric motor removably mounted on said casing at the exterior thereof for automatically tensioning the spring motor; transmission means in said casing interconnecting said electric motor and spring motor for transmitting movement of said electric motor to said spring motor to tension the latter; said transmission means including a worm and worm wheel; and friction clutch means located in said transmission means between said spring motor and said worm and worm wheel to allow the spring motor to be manually tensioned when the electric motor is not operating; and tension limiting means operatively connected only to said spring motor for limiting the tension of the same between predetermined limits.

5. A cinematographic apparatus, comprising, in combination, a casing; a spring motor in said casing capable of being manually tensioned and having a turnable tensioning part; an electric motor removably mounted on said casing at the exterior thereof for automatically tensioning said spring motor; transmission means in said casing interconnecting said electric motor and said turnable part of said spring motor for transmitting movement of the electric motor to said part of said spring motor to tension the latter, said transmission means including a worm and a worm wheel; friction clutch means located in said transmission means between said tensioning part of the spring motor and said worm and worm wheel to permit the spring motor to be manually tensioned when the electric motor is not operating; and one way rotation means operatively connected to said part of said spring motor to limit the same to one direction of rotation; and tension limiting means operatively connected only to said spring motor for limiting the tension of the same between predetermined limits.

6. A cinematographic apparatus as defined in claim 5 and wherein said one way rotation means comprises a dished portion connected to the spring motor and having an inner cylindrical wall; a support mounted within said dished portion and having at least one flat side surface facing said cylindrical wall; a friction member mounted on said support between said side surface thereof and said cylindrical wall; and resilient means mounted on said support and engaging said friction member to move the same along said side surface so that when said dished portion tends to rotate in one direction said friction member engages said cylindrical wall to prevent rotation of said dished portion in said one direction and when said dished portion rotates in an opposite direction said cylindrical wall moves said friction member against the action of said resilient means.

7. Cinematographic apparatus, comprising, in combination, a casing; a spring motor in said casing for driving parts of the apparatus; an electric motor connected to said casing at the exterior thereof and operatively connected to said spring motor for tensioning the same; control means interconnecting said electric motor and spring motor for automatically stopping and starting said electric motor; and tension limiting means in said casing operatively connected only to said spring motor for limiting the tension of the same between predetermined limits.

8. Cinematographic apparatus, comprising, in combination, a spring motor; transmission means connected to said spring motor for transmitting energy from the latter to parts of the apparatus so as to drive said parts; governor means connected to said transmission means for limiting the speed with which said parts are driven, said governor means comprising a shaft connected to said transmission means to be turned thereby, a support fixedly connected to said shaft to rotate therewith, a pair of masses symmetrically located about said shaft on said support, a pair of pivot pins located on said support and pivotally mounting said masses, respectively, for free turning movement on said support, a pair of projections respectively located on said masses for movement therewith, a pair of leaf springs respectively extending from the pivot pin of each mass to the projection of the same mass and engaging the latter to urge said masses toward each other, and a pair of curved bars respectively fixed to said pivot pins and extending along said leaf springs to vary the torque thereof as said masses pivot about said pivot pins, and a cylindrical member having an inner conical surface located about said masses to be engaged by the latter, said cylindrical member being slidably mounted on said shaft for movement therealong; and adjusting means operatively connected to said cylindrical member for locating the same at a predetermined position on said shaft.

9. In a cinematographic apparatus having a spring motor to drive the parts thereof, a governor assembly for limiting the speed at which the apparatus is operated, said assembly comprising, in combination, a shaft operatively connected to the spring motor to be rotated thereby; a support fixed to said shaft to rotate therewith; a pivot pin fixed to said support for rotation therewith; a mass located on said support and being formed with an aperture through which said pivot pin extends so that said mass is mounted for free turning movement on said support; a curved bar fixedly mounted on said pivot pin and being located over said mass; a projecting portion located on said mass distant from said pivot pin; a leaf spring fixed to said pivot pin, engaging said projecting portion, and extending along said bar so as to increase the centrifugal force required to move said mass as the latter turns about said pivot pin away from said shaft; and annular limiting means located about said shaft and support and having an inner surface in the path of movement of said mass when the latter turns about said pivot pin away from said shaft for limiting the extent to which said mass may turn outwardly away from said shaft.

10. In a cinematographic apparatus having a spring motor to drive the parts thereof, a governor assembly for limiting the speed at which the apparatus is operated, said assembly comprising, in combination, a shaft operatively connected to the spring motor to be rotated thereby; a support fixed to said shaft to rotate therewith; a pivot pin fixed to said support for rotation therewith; a mass located on said support and being formed with an aperture through which said pivot pin extends so that said mass is mounted for free turning movement on said support; a curved bar fixedly mounted on said pivot pin and being located over said mass; a projecting portion located on said mass distant from said pivot pin; a leaf spring fixed to said pivot pin, engaging said projecting portion, and extending along said bar so as to increase the centrifugal force required to move said mass as the latter turns about said pivot pin away from said shaft; annular limiting means located about said shaft and support and having an inner surface in the path of movement of said mass when the latter turns about said pivot pin away from said shaft for limiting the extent to which said mass may turn outwardly away from said shaft; and one way drive means operatively connected to said shaft for transmitting a drive thereto from the spring motor so that when the latter stops operating said shaft may continue to rotate.

11. Cinematographic apparatus, comprising, in combination, a picture taking unit including a spring motor for driving parts of the picture taking unit; a power supply unit removably mounted on said picture taking unit for tensioning said spring motor; transmission means located in said picture taking unit for transmitting energy from said power supply unit to said spring motor; and control means interconnecting said power supply unit and spring motor for maintaining the tensioning of the spring motor between predetermined limits, said control means being partly located in said power supply unit so as to be partly removable therewith from said picture taking unit, said picture taking unit comprising a housing having a transparent wall portion therein, said control means including in said housing a movable member located beneath said transparent wall portion, said movable member moving, during the winding and unwinding of said spring motor, and having positions indicative of the tension of the motor, the movable member being provided with a calibrated portion opposite said transparent wall portion to indicate the degree to which said spring motor is tensioned.

12. Cinematographic apparatus, comprising, in combination, a casing; a spring motor in said casing for driving parts of the apparatus, said spring motor having an axial shaft rotatable therewith; an electric motor connected to said casing at the exterior thereof and operatively connected to said spring motor for tensioning the same; control means interconnecting said electric motor and spring motor for automatically stopping and starting said electric motor; and tension limiting means in said casing operatively connected only to said spring motor for limiting the tension of the same between predetermined limits, said tension limiting means comprising a first gear rigidly connected to the axial shaft of said spring motor for rotation therewith and a second freely rotatable gear engaging said first gear for rotation therewith, said first gear having one tooth only, said second gear being provided with a long tooth projecting radially a greater distance from its axis than the other teeth thereon, so that when said one tooth on said first gear and said long tooth on said second gear engage one another during rotation of the motor in one direction, said first gear is halted, thereby limiting further rotation of said spring motor in said one direction.

References Cited in the file of this patent

UNITED STATES PATENTS

| | | |
|---|---|---|
| 1,425,863 | Kabbel | Aug. 15, 1922 |
| 1,751,903 | Browning | Mar. 25, 1930 |
| 1,751,904 | Browning | Mar. 25, 1930 |
| 2,318,453 | Bernard | May 4, 1943 |
| 2,613,761 | Golick | Oct. 14, 1952 |